United States Patent
Wesley et al.

(10) Patent No.: US 6,275,859 B1
(45) Date of Patent: Aug. 14, 2001

(54) TREE-BASED RELIABLE MULTICAST SYSTEM WHERE SESSIONS ARE ESTABLISHED BY REPAIR NODES THAT AUTHENTICATE RECEIVER NODES PRESENTING PARTICIPATION CERTIFICATES GRANTED BY A CENTRAL AUTHORITY

(75) Inventors: Joseph S. Wesley, Quincy; Dah Ming Chiu, Acton; Miriam C. Kadansky, Westford, all of MA (US); Stephen A. Hurst, Nashua, NH (US); Radia J. Perlman, Acton, MA (US); Joseph E. Provino, Cambridge, MA (US); Philip M. Rosenzweig, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/429,192

(22) Filed: Oct. 28, 1999

(51) Int. Cl.[7] ............................... G06F 15/16; H04L 9/00
(52) U.S. Cl. ..................... 709/229; 709/227; 713/156; 713/163
(58) Field of Search ................................. 709/227, 229, 709/249; 713/155–158, 162–163; 370/390

(56) References Cited

U.S. PATENT DOCUMENTS

| | | | |
|---|---|---|---|
| 5,202,921 | * | 4/1993 | Herzberg et al. ............... 713/162 |
| 5,224,163 | * | 6/1993 | Gasser et al. ..................... 380/30 |
| 5,339,403 | * | 8/1994 | Parker ............................. 711/121 |
| 5,588,060 | * | 12/1996 | Aziz ................................ 380/30 |
| 5,748,736 | * | 5/1998 | Mittra ............................ 713/163 |
| 5,940,391 | * | 8/1999 | Malkin et al. .................. 370/390 |
| 5,978,484 | * | 11/1999 | Apperson et al. ................ 380/25 |
| 5,982,898 | * | 11/1999 | Hsu et al. ...................... 713/156 |
| 6,002,768 | * | 12/1999 | Albanese et al. .............. 713/175 |
| 6,049,878 | * | 4/2000 | Caronni et al. ................ 713/201 |
| 6,088,805 | * | 7/2000 | Davis et al. ................... 713/202 |
| 6,134,599 | * | 10/2000 | Chiu et al. ..................... 709/252 |
| 6,151,633 | * | 11/2000 | Hurst et al. ................... 709/235 |
| 6,185,698 | * | 2/2001 | Wesley et al. ................... 714/18 |
| 6,195,751 | * | 2/2001 | Caronnie et al. .............. 713/163 |

FOREIGN PATENT DOCUMENTS 0 862 105 A2 * 2/1998 (EP) .

OTHER PUBLICATIONS

Chiu, D., et al., "TRAM: A Tree–based Reliable Multicast Protocol," Sun Microsystems Laboratory Technical Report, SML TR–98–66, Sun Microsystems, pp. 1–22, Jul. 1998.*
Hardjono et al., "Security Requirements for RMTP–II", Internet Engineering Task Force, May 27, 1999.

(List continued on next page.)

Primary Examiner—Zarni Maung
Assistant Examiner—Andrew Caldwell
(74) Attorney, Agent, or Firm—Weingarten, Schurgin, Gagnebin & Hayes LLP

(57) ABSTRACT

To authenticate and authorize prospective members in a reliable multicast data distribution setup, the prospective members contact a central authority to obtain a "participation certificate" for the multicast session. The central authority authenticates each node and issues a digitally signed certificate to the node. Each certificate contains information specifying the manner in which the respective node is authorized to participate in the multicast session in addition to the respective node's public key. The nodes exchange their participation certificates with each other during session-establishment dialog to prove their identities and their authorization to participate. Each node verifies the rights of other nodes based on authorization information contained in the participation certificate received from the other node. Thus, a node is allowed to participate as a repair node only if it presents a participation certificate authorizing it to do so. Disruption in network operation is avoided by reducing the ability of malicious nodes to consume resources to the detriment of legitimate session members.

8 Claims, 2 Drawing Sheets

OTHER PUBLICATIONS

Johnston et al., "Distributed Environments for Large Data–Objects—The Use of Public ATM Networks for Health Care Imaging Information Systems", http://www.igt.lbl.gov/johnston/APII1.1.fm.htm Chapter 3, date unknown.

The Globus Project., Implementation of the Globus Security Policy: v0.1 http://www–fp.globus.org/security/implementation.htn pp. 1–9, Sep. 1999.

Pessi, P., "Secure Multicast", http://www.tcm.hut.fi/opinnot/tik–110.501/1995/multicast.htn pp. 1–10, 1995.

Xu et al., "The Heuristics for the Constrained Multicast Routing", SIAN 1996—Asian Computing Science Conference, Dec 2–5 Singapore 1996.

* cited by examiner

TREE-BASED RELIABLE MULTICAST SYSTEM WHERE SESSIONS ARE ESTABLISHED BY REPAIR NODES THAT AUTHENTICATE RECEIVER NODES PRESENTING PARTICIPATION CERTIFICATES GRANTED BY A CENTRAL AUTHORITY

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of data communications networks, and more particularly to maintaining security in conjunction with reliable multicast data distribution in data communications networks.

In data communications networks, a technique known as "multicast" data distribution is used to carry out communication between a sender and a group of receivers. The sender uses a multicast address when sending data to the receivers. Multicast delivery is a best effort delivery, and therefore it is not reliable. There are many different ways of providing reliability in multicast. One way of providing reliability is by organizing a tree based data distribution setup with the sender of the multicast session at the root of the tree, and the receivers forming the leaves and the internal nodes of the tree. The internal nodes are called the "repair nodes". The repair nodes cache all data sent by the sender. Every repair node serves a set of receivers (member or child nodes) by performing retransmissions of the cached data when requested by the member/child nodes. When all the members of a repair node report the successful reception of a block of data, the particular block of data is freed by the repair node. This approach relieves the sender of performing retransmissions to every receiver of the multicast session that fails to receive the data successfully. The use of repair nodes improves the reliability of message delivery in a scalable manner. As the size of a multicast group increases, repair nodes can be added to share the tasks of caching and re-transmitting messages.

To build a tree based reliable data distribution setup, various security related issues have to be addressed to prevent malicious nodes from disrupting the data distribution. The repair nodes and the members have to authenticate each other, verify each other's permission to participate in the multicast session, and then exchange keying information so that the exchange of messages between the nodes can be digitally signed and verified every time. Some of the issues that can be exploited by malicious nodes in the absence of security are described below.

Each repair node has a limited number of "slots" or interfaces for different downstream receivers that it supports. For example, a given repair node may support up to a maximum of 32 downstream nodes. A malicious node may attempt to consume a large number of slots at a repair node, for example by joining the multicast session multiple times using different identities. If successful, this behavior may cause the repair node to deny requests from legitimate nodes to be admitted to the session, because the repair node has no slots available to support the legitimate nodes. These service denials represent unnecessary disruptions in the operation of the network.

Alternatively, a malicious node may continually request re-transmission of messages from a repair node, which interferes with the operation of the multicast session and undesirably increases network traffic.

It has been known to employ security measures in order to reduce the ability of a malicious node to interfere with a multicast session. In general, security features enable multicast session participants to authenticate each other (i.e., verify identity) and to verify each other's authorization to participate in the multicast session in a given capacity. For example, prior reliable multicast techniques have employed encrypted control messages or digitally signed control messages using symmetric keys, or digitally signed messages using asymmetric keys, for authentication purposes. It has also been known to maintain authorization information in a single trusted location within a network, and to require nodes to obtain authorization data from the trusted location before authorizing other nodes to participate in a multicast session.

While these prior techniques can be effective in improving security, they also have practical drawbacks. The use of a common group key (known as a symmetric key) for authentication in a multicast setup is generally less secure than other approaches, because the key is known to many nodes. In addition, a node verifying a message signature can only verify that the message came from a node belonging to the group, rather than verifying that it came from a particular node. The use of public/private keys (known as asymmetric keys) and certificates enables a node to verify that a message originated from a particular node by consulting information in a trusted location at the time of building the distribution tree. However, this approach can result in availability and performance related problems.

Moreover, enabling nodes to verify each other's authenticity independently by the use of digital certificates requires nodes to either have the public part of the asymmetric keys of many different certificate authorities stored locally or to procure the public keys over the network when required for verification of the certificate. Storing the public keys is unattractive because of the consumption of storage space, the inability to store the public keys of all possible certificate authorities and the cumbersome task of ensuring that the latest revisions of the keys are maintained. Procuring the public keys when required is unattractive for reasons related to performance and latency. Even if the nodes can verify authenticity of each other independently, the authorization to participate in a multicast session still needs to be verified.

It would be desirable to achieve desired security in reliable multicast communications while avoiding these practical drawbacks of prior approaches.

BRIEF SUMMARY OF THE INVENTION

Consistent with the present invention, a technique for member authentication and authorization in a reliable multicast data distribution setup is disclosed that provides desirable security while avoiding availability and performance problems of prior approaches.

In the disclosed technique, nodes that are prospective session members each contact a designated central authority to obtain a "participation certificate" for the multicast session. The central authority authenticates each node using any of a variety of techniques, and if authentication is successful then issues the certificate to the node. The participation certificate serves as a credential enabling the node to participate in the multicast session. Each certificate is digitally signed by the central authority, and contains information specifying the authorized node's public key, the manner in which the node can participate in the multicast session (e.g. permission to participate as a repair node or not), the details of the events or duration/interval for which the node is authorized to participate, etc.

Subsequently, when the nodes engage in session-establishment dialog with each other, the nodes exchange their participation certificates to prove their identities and their authorization to participate. Each node is responsible for verifying the other nodes' rights, abilities to participate in a particular segment of a session, etc., based on the authorization information contained in the participation certificate received from the other nodes. For example, before a repair node allocates a slot to a new downstream receiver node, the repair node checks the prospective receiver's certificate to verify that the node is authorized to participate in the session. Receiver nodes likewise check the certificates of nodes claiming to be available as repair nodes before admitting them in that capacity.

The participation certificates are all signed by a single central authority, and can therefore be decrypted using the public key of the central authority. Thus, member nodes need to maintain only the public key of the central authority to carry out authentication measures. In addition, member nodes obtain authorization information directly from the certificates, rather than requesting such information from a single remote location. Performance and availability of the network are thus enhanced.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
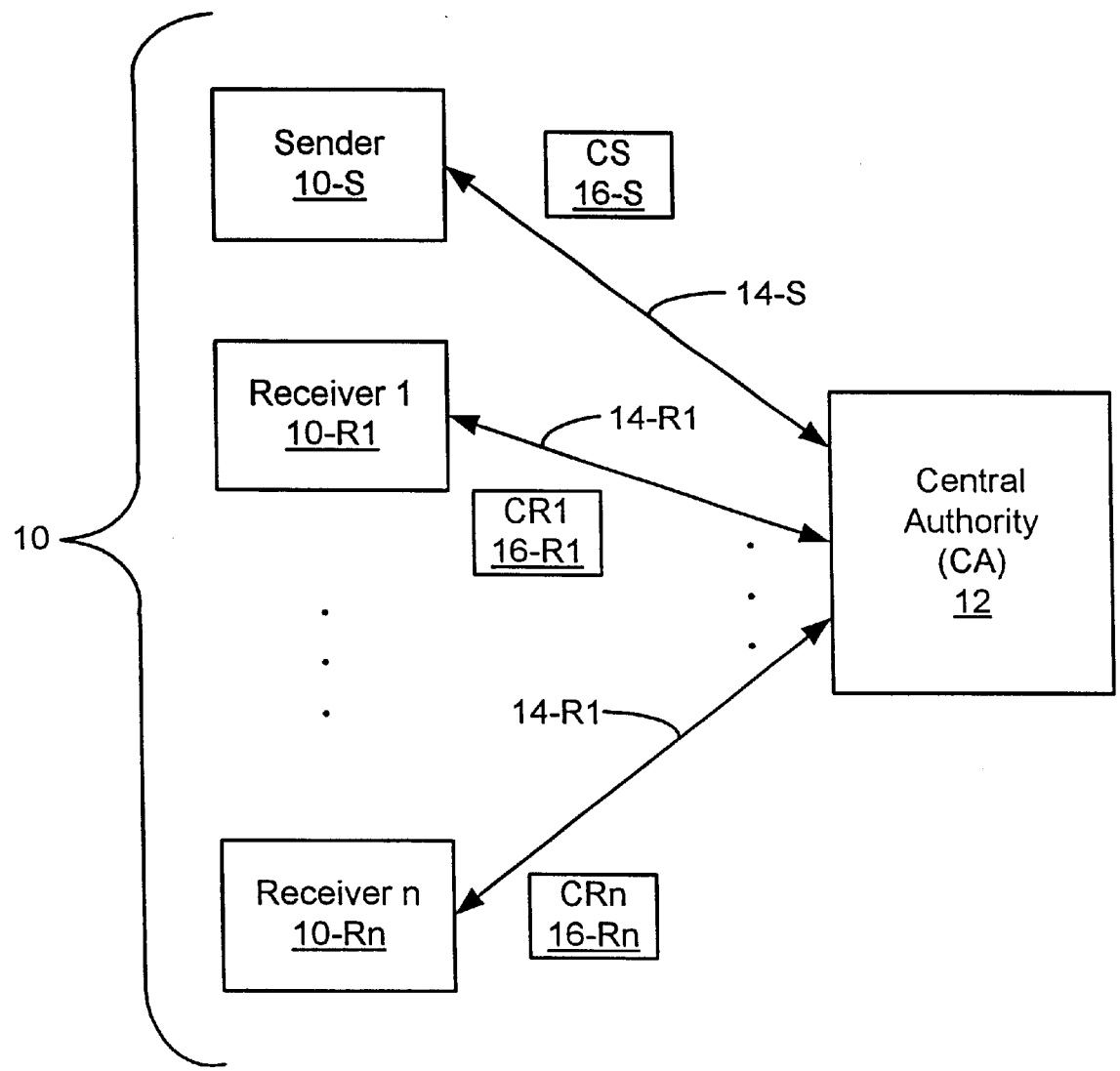
FIG. 1 is a block diagram showing a plurality of network nodes obtaining multicast session participation certificates from a central authority consistent with the present invention.

Referring to FIG. 1, a number of network nodes 10 are to become part of a multicast data distribution session. Included in the set of nodes 10 are a sender node 10-S and one or more receiver nodes 10-R1 through 10-RN. During the multicast session to be established, data packets are originated by the sender node 10-S and delivered to the various receiver nodes 10-R1 though 10-RN.

Before joining a multicast session, each node 10 contacts a central authority or CA 12 to obtain the necessary credentials. The CA 12 is generally a separate network node that is responsible for managing access to the multicast session. The CA 12 may also be referred to as a channel manager or group controller. Each node 10 communicates with the CA 12 via a respective secure unicast channel 14 (shown as channels 14-S and 14-1 through 14-RN in FIG. 1).

Upon being contacted by a node 10, the CA 12 authenticates the node 10 via any appropriate means, which can include for example using signed certificates, passwords, or a registration process in which a prospective group member obtains a group identity after submitting payment information such as a credit card number. If the node 10 approaches the CA 12 with a digitally signed certificate, the CA 12 verifies the certificate by using the public key of the authority that signed the node's certificate. Thus, the CA 12 is responsible for maintaining or procuring on demand the public keys of all certificate-issuing authorities. While this functionality suffers from the drawbacks discussed above, such as latency and/or increased storage space, it need only be performed at the CA 12, and not at each node 10 participating in a session. Furthermore, this operation at the CA 12 can be performed out of band, or before the multicast session starts, and not during an active multicast session.

Upon authenticating a node 10, the CA 12 issues a participation certificate 16 (shown as certificates 16-S and 16-R1 through 16-RN in FIG. 1) to the node 10. Each participation certificate 16 is digitally signed by the CA 12. In addition to the digital signature, each participation certificate 16 includes the public key half of a public/private key pair uniquely associated with the node 10 receiving the certificate. Each participation certificate 16 also includes additional information such as starting and ending times for a period of authorized participation by the node 10, and/or an identifier of a role the node 10 may play in the multicast session. Role information can be used to permit a node to function as a repair node, for example.

Figure 2:
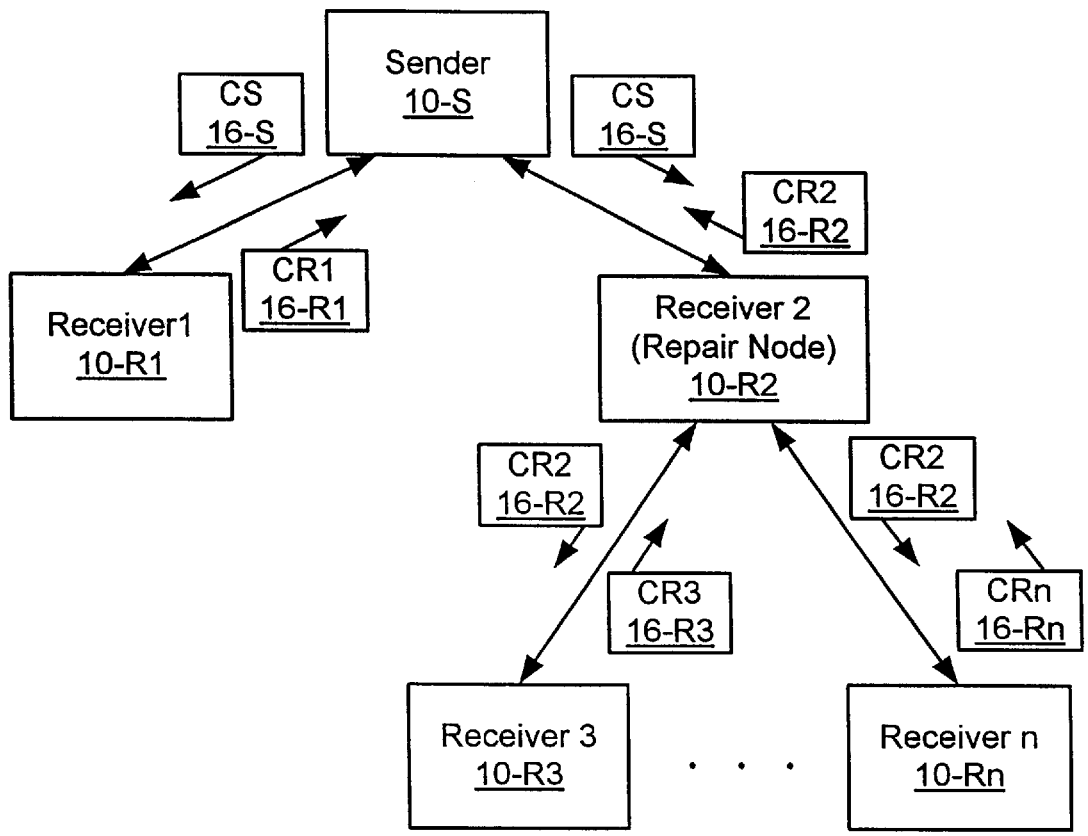
FIG. 2 is a block diagram showing the network nodes of FIG. 1 exchanging participation certificates during the establishment of a multicast session.

FIG. 2 shows the use of the participation certificates 16 in the context of a tree-based reliable multicast protocol. In FIG. 2, the receiver 10-R2 functions as a repair node. One function of a repair node is to maintain a cache of messages that have recently been received from the sender 10-S for retransmission when requested by the downstream receivers, such as receivers 10-R3 through 10-RN as shown in FIG. 2. The repair node 10-R2 maintains each message in the cache until it receives a positive acknowledgment from all the downstream receivers for which it functions as a repair node, i.e., receivers 10-R3 through 10-RN.

As shown, the nodes 10 exchange their respective certificates as part of the communication process by which the repair tree for the multicast session is built. For example, the sender node 10-S includes its certificate 16-S in session control messages sent to the receiver 10-R1 and the receiver 10-R2 soliciting membership in the multicast session. Similarly, the repair node 10-R2 includes its certificate 16-R2 in messages sent to the receivers 10-R3 through 10-RN advertising its availability as a repair node. All receivers 10 include their respective certificates 16 in session control messages sent to either the sender 10-S or the repair node 10-R2 advertising their desire and ability to become receiver members of the multicast session.

Each node 10 is responsible for using the information in the certificates 16 received from other nodes 10 to verify that the other nodes 10 are authorized to participate in the multicast session. In particular, a node 10 verifies that another node 10 advertising its ability to play a particular role, such as the role of repair node, is authorized to play such a role. A node 10 performs this verification by comparing the advertised ability with information in the certificate. Once the repair node and the receiver authenticate and verify each other's authorization, every control message exchanged henceforth between the two nodes is digitally signed. Digital signatures enable the nodes to accept and process only those messages that are produced by legitimate nodes, and to thus discard messages from malicious nodes.

Those skilled in the art should readily appreciate that the functions of the present invention can be realized in software programs that may be delivered to respective processors located in the senders 10-S, the receivers 10-R, and the CA 12 of FIG. 1 and FIG. 2 in many forms; including, but not limited to: (a) information permanently stored on non-writable storage media (e.g., read-only memory devices within a computer such as ROM or CD-ROM disks readable by a computer I/O attachment; (b) information alterably stored on writable storage media (e.g., floppy disks, tapes, read/write optical media and hard drives); or (c) information conveyed to a computer through a communication media, for example, using baseband signaling or broadband signaling techniques, such as over computer or telephone networks via a modem. In addition, while in the present embodiment the functions are illustrated as being software-driven and executable out of a memory by a processor, the presently described functions may alternatively be embodied in part or in whole using hardware components such as Application Specific Integrated Circuits (ASICs), state machines, controllers or other hardware components or devices, or a combination of hardware components and software.

In an exemplary hardware platform on which a software based implementation of the present invention executes, the program code executes on one or more processors, for example a microprocessor. The program code may be stored in, and may be executed on the processor from, a memory such as a Random Access Memory (RAM) or Read Only Memory (ROM). The memory storing the program code is communicable with the processor, for example by way of a memory bus. In addition, the exemplary platform may include various input/output (I/O) devices, such as secondary data storage devices such as magnetic and/or optical disks.

Further, it will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A method of establishing a reliable multicast data distribution session, comprising:

receiving at a repair node, when engaging in dialog with respect to the establishment of the multicast session, a certificate from a central authority authenticating a receiver for participation in the reliable multicast session;

authenticating the receiver based on its presentation of its participation certificate; and approving the receiver for participating as a receiver in the reliable multicast session based on authorization information contained in its participation certificate.

2. A method of establishing a reliable multicast data distribution session, comprising:

at a network node acting as a central authority, providing each of a plurality of network nodes with a respective participation certificate serving as a credential enabling the node to participate in the reliable multicast data distribution session, each certificate being digitally signed by the central authority and containing authorization information specifying the manner in which the respective node is authorized to participate in the multicast session, the network nodes including a sender and a plurality of receivers, the receivers being organized into repair groups each including one receiver designated as a repair node for the group, the repair node for each group being responsible for reliably re-transmitting multicast messages received from the sender to any of the other receivers of the group upon request;

at the repair node for each repair group:

exchanging participation certificates with the other receivers of the repair group when engaging in dialog with respect to the establishment of the multicast session;

authenticating the other receivers of the repair group based on their presentation of their respective participation certificates; and verifying the right of each of the other receivers of the repair group to participate as a receiver in the session based on the authorization information contained in the respective participation certificate; and at each receiver other than the repair node in each repair group, upon exchanging participation certificates with the repair node of the group when engaging in dialog with respect to the establishment of the multicast session:

authenticating the repair node of the group based on its presentation of its participation certificate; and verifying the right of the repair node to participate as a repair node in the session based on the authorization information contained in its participation certificate.

3. A method according to claim 2, wherein the information contained in each participation certificate includes information specifying an interval during which the respective node is authorized to participate in the multicast session, and wherein verifying the right of a node to participate in the session includes determining whether the node seeks to participate in the multicast session during an interval that is included within the interval specified in the participation.

4. A system for establishing a reliable multicast data distribution session, comprising:

a central authority; and a plurality of network nodes, the network nodes including a sender and a plurality of receivers, the receivers being organized into repair groups each including one receiver designated as a repair node for the group, the repair node for each group being responsible for reliably transmitting multicast messages received from the sender to each of the other receivers of the group;

the central authority being operative to provide each of the network nodes with a respective participation certificate serving as a credential enabling the node to participate in the reliable multicast data distribution session, each certificate being digitally signed by the central authority and containing authorization information specifying the manner in which the respective node is authorized to participate in the multicast session, the repair node for each repair group being operative to:

exchange participation certificates with the other receivers of the repair group when engaging in dialog with respect to the establishment of the multicast session;

authenticate the other receivers of the repair group based on their presentation of their respective participation certificates; and verify the right of each of the other receivers of the repair group to participate as a receiver in the session based on the authorization information contained in the respective participation certificate, and each receiver other than the repair node of each repair group being operative to:

(i) exchange participation certificates with the repair node of the group when engaging in dialog with respect to the establishment of the multicast session, (ii) verify the right of the repair node to participate as a repair node in the session based on the authorization information contained in the participation certificate received from the repair node, and (iii) use the repair node's public key included in the participation certificate to verify and accept digitally signed messages sent by the repair node.

5. A computer program product including a computer readable medium, the computer readable medium having a reliable multicast member verification program stored thereon for execution in a computer functioning as a network node, the reliable multicast member verification program comprising:

program code for obtaining a multicast session participation certificate from a central authority, the participation certificate serving as a credential enabling the network node to participate in a reliable multicast data distribution session, the certificate being digitally signed by the central authority and containing information specifying that the network node is authorized to participate as a repair node in the multicast session; and program code for (i) exchanging participation certificates with receiver nodes when engaging in dialog with respect to the establishment of the multicast session, (ii) verifying the right of each receiver node to participate in the session based on authorization information contained in the participation certificate received from the receiver node, and (iii) using the receiver node's public key included in its participation certificate to verify and accept digitally signed messages sent by the receiver node.

6. A computer data signal including a computer program for use in establishing a reliable multicast data distribution session, the computer program comprising:

program code for obtaining a multicast session participation certificate from a central authority, the participation certificate serving as a credential enabling a network node to participate in the reliable multicast data distribution session, the certificate being digitally signed by the central authority and containing information specifying that the network node is authorized to participate as a repair node in the multicast session; and program code for (i) exchanging participation certificates with receiver nodes when engaging in dialog with respect to the establishment of the multicast session, (ii) verifying the right of each receiver node to participate as a receiver in the session based on authorization information contained in the participation certificate received from the receiver node, and (iii) using the receiver node's public key included in its participation certificate to verify and accept digitally signed messages sent by the receiver node.

7. A system for establishing a reliable multicast data distribution session, comprising:

means, at a network node acting as a central authority, for providing each of a plurality of network nodes with a respective participation certificate serving as a credential enabling the node to participate in the reliable multicast data distribution session, each certificate being digitally signed by the central authority and containing authorization information specifying the manner in which the respective node is authorized to participate in the multicast session the network nodes including a sender and a plurality of receivers, the receivers being organized into repair groups each including one receiver designated as a repair node for the group, the repair node for each group being responsible for reliably re-transmitting multicast messages received from the sender to any of the other receivers of the group upon request;

means at the repair node for each repair group for:

exchanging participation certificates with the other receivers of the repair group when engaging in dialog with respect to the establishment of the multicast session;

authenticating the other receivers of the repair group based on their presentation of their respective participation certificates; and verifying the right of each of the other receivers of the repair group to participate as a receiver in the session based on the authorization information contained in the respective participation certificate; and means, at each receiver other than the repair node in each repair group, upon exchanging participation certificates with the repair node of the group when engaging in dialog with respect to the establishment of the multicast session, for (i) verifying the right of the repair node to participate as a repair node in the session based on the authorization information contained in the participation certificate received from the repair node, and (ii) using the repair node's public key included in its participation certificate to verify and accept digitally signed messages sent by the repair node.

8. A method of establishing a reliable multicast data distribution session, comprising:

at a network node, receiving from a central authority a participation certificate serving as a credential enabling the node to participate in the reliable multicast data distribution session, each certificate being digitally signed by the central authority and containing information specifying that the node is authorized to participate as a repair node in the multicast session;

exchanging participation certificates with receiver network nodes when engaging in dialog with respect to the establishment of the multicast session;

authenticating the receiver nodes based on their presentation of their respective participation certificates; and verifying the right of each receiver node to participate as a receiver node in the session based on the authorization information contained in the participation certificate received from the receiver node.

* * * * *

UNITED STATES PATENT AND TRADEMARK OFFICE
CERTIFICATE OF CORRECTION

PATENT NO.   : 6,275,859 B1
DATED        : August 14, 2001
INVENTOR(S)  : Joseph S. Wesley et al.

It is certified that error appears in the above-identified patent and that said Letters Patent is hereby corrected as shown below:

<u>Column 3,</u>
Line 64, "14-1" should read -- 14-R1 --.

Signed and Sealed this

Seventh Day of May, 2002

Attest:

Attesting Officer

JAMES E. ROGAN
Director of the United States Patent and Trademark Office